(12) United States Patent
Xu et al.

(10) Patent No.: US 11,099,673 B2
(45) Date of Patent: Aug. 24, 2021

(54) TOUCH DISPLAY PANEL, DISPLAY DEVICE AND METHOD FOR MANUFACTURING TOUCH DISPLAY PANEL

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Jingyi Xu, Beijing (CN); Yuelin Wang, Beijing (CN); Guangshuai Wang, Beijing (CN); Yanwei Ren, Beijing (CN); Peirong Huo, Beijing (CN); Xintong Fan, Beijing (CN); Jinyu Chao, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/645,806

(22) PCT Filed: Mar. 12, 2019

(86) PCT No.: PCT/CN2019/077731
§ 371 (c)(1),
(2) Date: Mar. 10, 2020

(87) PCT Pub. No.: WO2019/223399
PCT Pub. Date: Nov. 28, 2019

(65) Prior Publication Data
US 2020/0272267 A1    Aug. 27, 2020

(30) Foreign Application Priority Data
May 23, 2018  (CN) .......................... 201810503797.5

(51) Int. Cl.
| | | |
|---|---|---|
| *G06F 3/041* | (2006.01) | |
| *G06F 3/044* | (2006.01) | |
| *G06F 3/047* | (2006.01) | |

(52) U.S. Cl.
CPC ............ *G06F 3/0412* (2013.01); *G06F 3/044* (2013.01); *G06F 3/047* (2013.01); *G06F 3/0416* (2013.01);
(Continued)

(58) Field of Classification Search
CPC ...... G06F 3/0412; G06F 3/0416; G06F 3/044; G06F 3/047; G06F 2203/04103; G06F 2203/04107
See application file for complete search history.

(56) References Cited

U.S. PATENT DOCUMENTS

| | | |
|---|---|---|
| 2015/0103267 A1 | 4/2015 | Zhang et al. |
| 2018/0129339 A1 | 5/2018 | Huang et al. |
| 2018/0136773 A1* | 5/2018 | Chen ................... G06F 3/04164 |

FOREIGN PATENT DOCUMENTS

| | | |
|---|---|---|
| CN | 103500044 | 1/2014 |
| CN | 106814913 | 6/2017 |

(Continued)

OTHER PUBLICATIONS

Office action from Chinese Application No. 201810503797.5 dated Mar. 10, 2020.
(Continued)

*Primary Examiner* — Peter D McLoone
(74) *Attorney, Agent, or Firm* — Calfee, Halter & Griswold LLP

(57) ABSTRACT

Disclosed is a touch display panel, a display device and a method for manufacturing a touch display panel. The touch display panel includes a ground wire and a switching element. The ground wire is configured to allow static
(Continued)

electricity in the touch display panel to be discharged through the ground wire. The switching element is configured to be turned on or turned off according to an operating state of the touch display panel to control whether the static electricity is discharged through the ground wire.

11 Claims, 4 Drawing Sheets

(52) U.S. Cl.
　　CPC .............. *G06F 2203/04103* (2013.01); *G06F 2203/04107* (2013.01)

(56) References Cited

FOREIGN PATENT DOCUMENTS

| | | |
|---|---|---|
| CN | 106873821 | 6/2017 |
| CN | 108415622 | 8/2017 |
| CN | 107340908 | 11/2017 |
| CN | 103500044 | 1/2018 |
| CN | 108415622 | 8/2018 |

OTHER PUBLICATIONS

International Search Report from PCT/2019/077731 dated Jun. 11, 2019.

\* cited by examiner

TOUCH DISPLAY PANEL, DISPLAY DEVICE AND METHOD FOR MANUFACTURING TOUCH DISPLAY PANEL

RELATED APPLICATION

The present application is a 35 U.S.C. 371 national stage application of PCT International Application No. PCT/CN2019/077731, filed on Mar. 12, 2019, which claims the benefit of Chinese Patent Application No. 201810503797.5, filed on May 23, 2018, the contents of which are incorporated herein by reference in their entireties.

TECHNICAL FIELD

The present disclosure relates to the field of display technologies, and in particular, to a touch display panel, a display device and a method for manufacturing a touch display panel.

BACKGROUND

Integrating the touch function inside the display panel is a common method to realize the multi-touch function. However, such a display panel may have many defects, such as poor touch sensitivity, poor accuracy, and other defects.

SUMMARY

According to an exemplary embodiment, there is provided a touch display panel, comprising: a ground wire configured to allow static electricity in the touch display panel to be discharged through the ground wire, and a switching element configured to be turned on or turned off according to an operating state of the touch display panel to control whether the static electricity is discharged through the ground wire.

In some exemplary embodiments, the operating state of the touch display panel comprises a touching state and a displaying state, and the switching element is configured to be turned off in response to the touching state such that the static electricity is not discharged through the ground wire and to be turned on in response to the displaying state such that the static electricity is discharged through the ground wire.

In some exemplary embodiments, the touch display panel further comprises an array substrate, wherein the switching element is in the array substrate.

In some exemplary embodiments, the ground wire is electrically connected to a ground terminal of the array substrate.

In some exemplary embodiments, the touch display panel further comprises a light shielding layer, wherein a ground terminal of the light shielding layer is electrically connected to the ground wire.

In some exemplary embodiments, the touch display panel further comprises an upper polarizing layer, wherein a ground terminal of the upper polarizing layer is electrically connected to the ground wire.

In some exemplary embodiments, the touch display panel further comprises an array substrate, wherein the switching element is in the array substrate, a light shielding layer, an upper polarizing layer, and a conductive adhesive layer. At least two of a ground terminal of the array substrate, a ground terminal of the light shielding layer and a ground terminal of the upper polarizing layer are electrically connected to the ground wire through the conductive adhesive layer.

According to another exemplary embodiment, there is provided a display device, comprising the touch display panel according to any one of the exemplary embodiments.

According to another exemplary embodiment, there is provided a method for manufacturing a touch display panel, comprising: providing an array substrate comprising a switching element, wherein the switching element comprises a signal receiving terminal and a controlling terminal; providing a signal outputting terminal configured to output a signal indicating an operating state of the touch display panel; electrically connecting the signal receiving terminal of the switching element to the signal outputting terminal; and forming a ground wire electrically connected to the controlling terminal of the switching element.

In some exemplary embodiments, forming the ground wire electrically connected to the controlling terminal of the switching element comprises: electrically connecting the ground wire to a ground terminal of the array substrate.

In some exemplary embodiments, the method further comprises providing a light shielding layer and an upper polarizing layer on the array substrate.

In some exemplary embodiments, forming the ground wire electrically connected to the controlling terminal of the switching element comprises electrically connecting the ground wire to at least one of a ground terminal of the array substrate, a ground terminal of the light shielding layer and a ground terminal of the upper polarizing layer.

In some exemplary embodiments, the method further comprises providing a conductive adhesive layer such that at least two of a ground terminal of the array substrate, a ground terminal of the light shielding layer and a ground terminal of the upper polarizing layer are each electrically connected to the conductive adhesive layer; and forming the ground wire electrically connected to the controlling terminal of the switching element comprises: electrically connecting the ground wire to the conductive adhesive layer.

In some exemplary embodiments, providing the array substrate comprising the switching element comprises: providing a substrate; forming the switching element on the substrate; and forming a pixel switching element on the substrate, wherein forming the switching element on the substrate and forming the pixel switching element on the substrate are conducted simultaneously and adopt a same process.

BRIEF DESCRIPTION OF THE DRAWINGS

Exemplary embodiments of the present disclosure are described in more detail and by way of non-limiting examples with reference to the accompanying drawings, in which.

DETAILED DESCRIPTION

In order to take into account both of the stringent requirements of the users for the display effect and the touch performance, the degree of integration of the display module and the touch module of a touch display panel is becoming higher and higher. At present, some display panels tend to integrate the touch function inside the panel, i.e., the in-screen touch. However, as the integration degree increases, the display panel may have some problems, such as the decrease in sensitivity and accuracy of the touch function. One reason is that, the principle of touch detection is that when a user performs a touch operation on a touch display panel, the capacitance of the touch layer changes due to the touch operation. Since static electricity may be generated in various layers of the display panel, the touch display panels of the related art discharge the static electricity in real time. However, this may cause a voltage difference between the touch layer and other layers, such that the detection of the capacitance of the touch layer may be influenced. This affects the touch performance of the touch display panel.

Figure 1:
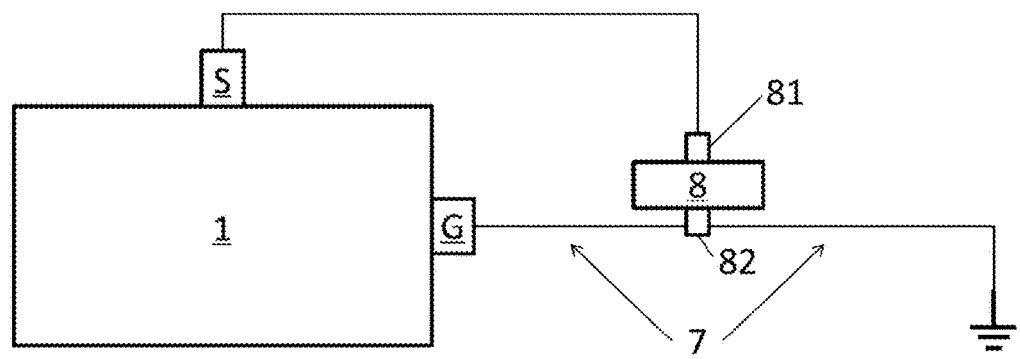
FIG. 1 schematically illustrates a block diagram of the structure of a touch display panel according to an exemplary embodiment.

FIG. 1 schematically illustrates a block diagram of the structure of a touch display panel according to an exemplary embodiment. As shown in FIG. 1, the touch display panel 1 comprises a ground wire 7 and a switching element 8. The ground wire 7 is electrically connected between the ground terminal G of the touch display panel 1 and a ground potential. It should be understood that the terms such as "ground potential" mean a position where the electric potential approaches zero, or a position where the electric potential is lower than the internal electric potential of the touch display panel, and is not limited to the ground. In addition, the terms such as "electrically connected" or "electrical connection" indicate that electric charges can be transmitted between the elements defined by the terms. It is not excluded that a conductive medium may exist between these elements. These elements are not required to be physically connected. A switching element 8 is provided in the ground wire 7. Specifically, the controlling terminal 82 of the switching element 8 is connected to the ground wire 7. The connection and the disconnection of the ground wire 7 can be controlled by controlling the ON and OFF of the switching element 8. The switching element 8 further comprises a signal receiving terminal 81, which is connected to the signal outputting terminal S of the touch display panel 1. The signal outputting terminal S can output a signal indicating the operating state of the touch display panel 1. For example, this signal can indicate that the touch display panel 1 is in a touching state or is in a displaying state. After the signal is transmitted to the switching element 8 via the signal receiving terminal 81 of the switching element 8, the switching element 8 can be turned on or off according to the operating state of the touch display panel 1. When the switching element 8 is turned on, the ground wire 7 is connected, such that the static electricity charges accumulated in the touch display panel 1 can be discharged to the ground potential through the ground wire 7. Conversely, when the switching element 8 is turned off, the ground wire 7 is disconnected, such that the static electricity charges in the touch display panel 1 will not be discharged.

Specifically, when the touch display panel 1 is in the touching state, the signal outputting terminal S outputs a signal corresponding to the touching state, so that the switching element 8 is turned off. In this situation, the static electricity charges in the touch display panel 1 are not discharged. When the touch display panel 1 is in the displaying state, the signal outputting terminal S outputs a signal corresponding to the displaying state, so that the switching element 8 is turned on. In this situation, the ground wire 7 is connected, and the static electricity charges in the touch display panel 1 can be discharged through the ground wire 7.

Compared with the conventional touch display panels, the touch display panels according to exemplary embodiments can control the specific period during which the static electricity generated in the touch display panel 1 is discharged, by providing the switching element 8 in the ground wire 7 and turning the switching element 8 on or off according to the operating state of the touch display panel 1. In this way, the static electricity generated by the touch display panel 1 during the touch operation can be discharged to a low potential during the display operation, and not discharged during the touch operation. As a result, there will be no voltage difference generated between the various layers of the touch display panel or the generated voltage difference is extremely small, so the interference of the static electricity on the capacitance can be eliminated or reduced, thereby reducing the impact on the touch operation and improving the display effect and the touch performance of the panel (for example, resulting in a good touch response).

Figure 2:
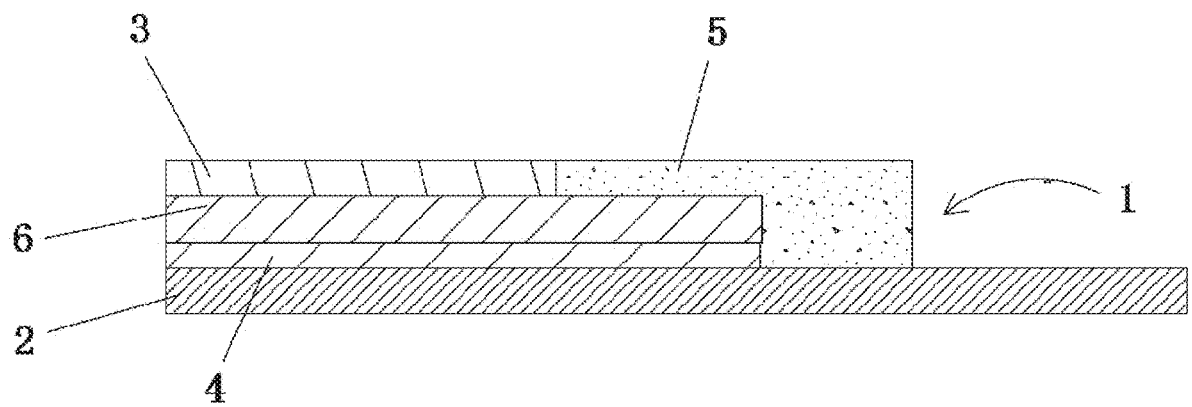
FIG. 2 schematically illustrates a cross-sectional view of the layer structure of a touch display panel according to an exemplary embodiment.

FIG. 2 schematically illustrates a cross-sectional view of the layer structure of a touch display panel according to an exemplary embodiment. As shown in FIG. 2, the touch display panel 1 according to exemplary embodiments belongs to the in-screen touch panel, and comprises an array substrate 2, a lower polarizing layer (not shown) disposed below the array substrate 2, a color film substrate 6 and an upper polarizing layer 3 above the array substrate 2. The color film substrate 6 may comprise a light shielding layer 4, which is also known as black matrix. It should be noted that the touch display panel 1 shown in FIG. 2 is only an example. The structure of the touch display panel 1 of the present disclosure is not limited to the specific structure shown in FIG. 2.

In some exemplary embodiments, the switching element 8 can be formed independently from the layer structures of the touch display panel 1 shown in FIG. 2, and then the switching element 8 and the ground wire 7 are connected to the touch display panel 1 as shown in FIG. 1.

In other exemplary embodiments, the switching element 8 may be formed on the array substrate 2. For example, it may be formed at the same time as the pixel switching elements in the array substrate 2, or it may be formed separately from the pixel switching elements. When the switching element 8 and the pixel switching elements are formed at the same time, these two kinds of elements can be formed by using the same manufacturing process. For example, the switching element 8 and the pixel switching elements can be formed using the same set of steps comprising coating photoresist, exposing, developing, etching, and stripping the photoresist, etc.

In some exemplary embodiments, the ground terminal G of the touch display panel 1 as shown in FIG. 1 may be the ground terminal of the array substrate 2, the ground terminal of the light shielding layer 4, the ground terminal of the upper polarizing layer 3, or the ground terminal of the other structures of the touch display panel 1. The ground terminal G may also be a terminal electrically connected to one or more of the above ground terminals.

In some exemplary embodiments, as shown in FIG. 2, the touch display panel 1 may further comprise a conductive adhesive layer 5. The ground terminals of at least two of the array substrate 2, the light shielding layer 4, and the upper polarizing layer 3 may be electrically connected to the ground wire 7 through the conductive adhesive layer 5. Therefore, the ground wire 7 can discharge the static electricity of multiple layers in the touch display panel 1 to a low potential.

Figure 3:
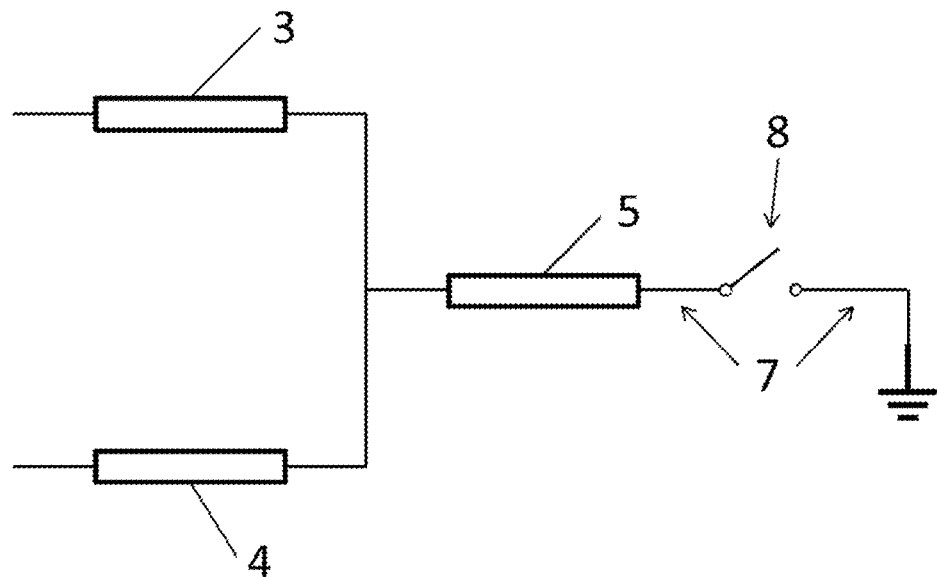
FIG. 3 schematically illustrates a partial circuit diagram of a touch display panel according to an exemplary embodiment during a touch operation.
Figure 4:
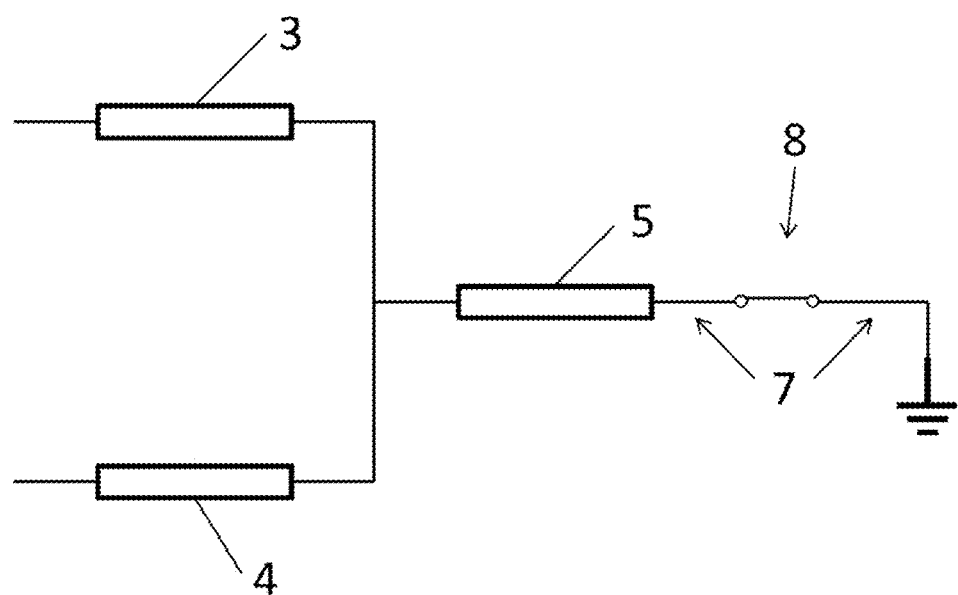
FIG. 4 schematically illustrates a partial circuit diagram of a touch display panel according to an exemplary embodiment during a display operation.

FIG. 3 schematically illustrates a partial circuit diagram of a touch display panel according to an exemplary embodiment during a touch operation. FIG. 4 schematically illustrates a partial circuit diagram of a touch display panel according to an exemplary embodiment during a display operation.

In the exemplary embodiments shown in FIGS. 3 and 4, the ground terminals of the upper polarizing layer 3 and the light shielding layer 4 of the touch display panel 1 are both connected to the conductive adhesive layer 5. The conductive adhesive layer 5 is electrically connected to the ground wire 7. The switching element 8 is arranged in the ground wire 7. The switching element 8 can be turned on or off according to the operating state of the touch display panel 1, thereby controlling the connection and disconnection of the ground wire 7. When the touch display panel 1 is in the touching state, as shown in FIG. 3, the switching element 8 is turned off, and the static electricity in the upper polarizing layer 3 and the light shielding layer 4 is not discharged to a low potential. When the touch display panel 1 is in the displaying state, the switching element 8 is turned on, and the static electricity in the upper polarizing layer 3 and the light shielding layer 4 is discharged to a low potential.

In the touch display panel 1 according to an exemplary embodiment, the switching element 8 may be configured to be turned off in response to the touch display panel 1 being in the touching state, so that the static electricity charges in the upper polarizing layer 3 and the light shielding layer 4 are not discharged. In this case, the upper polarizing layer 3 and light shielding layer 4 will generate a static electricity voltage that is the same as or similar to the operation voltage of the array substrate 2, so that the voltage difference between the upper polarizing layer 3 and the array substrate 2 is zero, and the voltage difference between the light shielding layer 4 and the array substrate 2 is zero, and the interference capacitance affecting the operation of the array substrate 2 will not be generated. When the touch display panel 1 finishes the touch operation and performs the display operation (during the display operation, the operation of the touch display panel 1 includes only displaying the image), the switching element 8 is closed (i.e., turned on), and the ground wire 7 is connected in order to discharge the static electricity charges accumulated in the upper polarizing layer 3 and the light shielding layer 4, such that the touch accuracy of the touch display panel keeps stable and the touch display panel 1 is prevented from having an influenced touch effect due to the accumulation of a large amount of static electricity charges.

Figure 5:
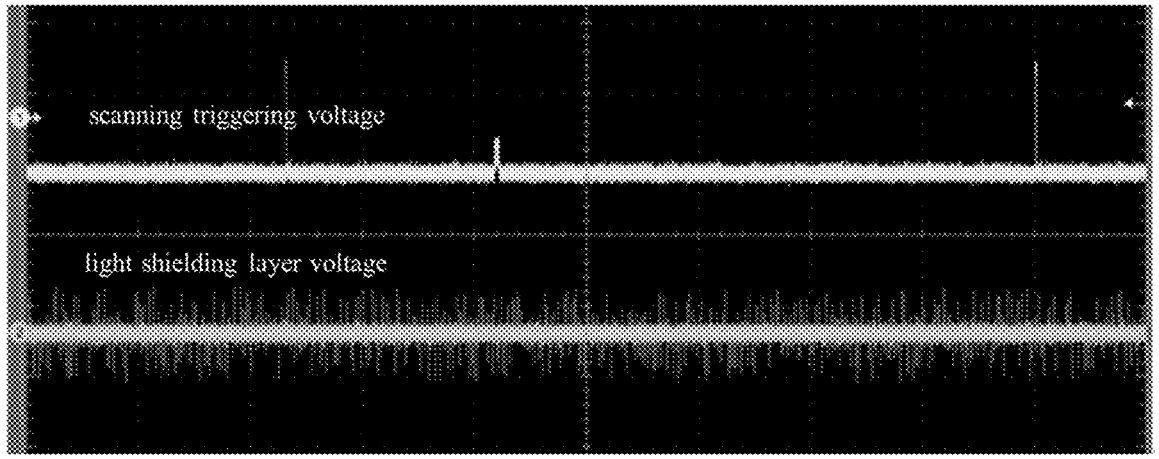
FIG. 5 schematically illustrates operation waveform diagrams of a light shielding layer and an array substrate of a touch display panel in the related art during a touch operation.
Figure 6:
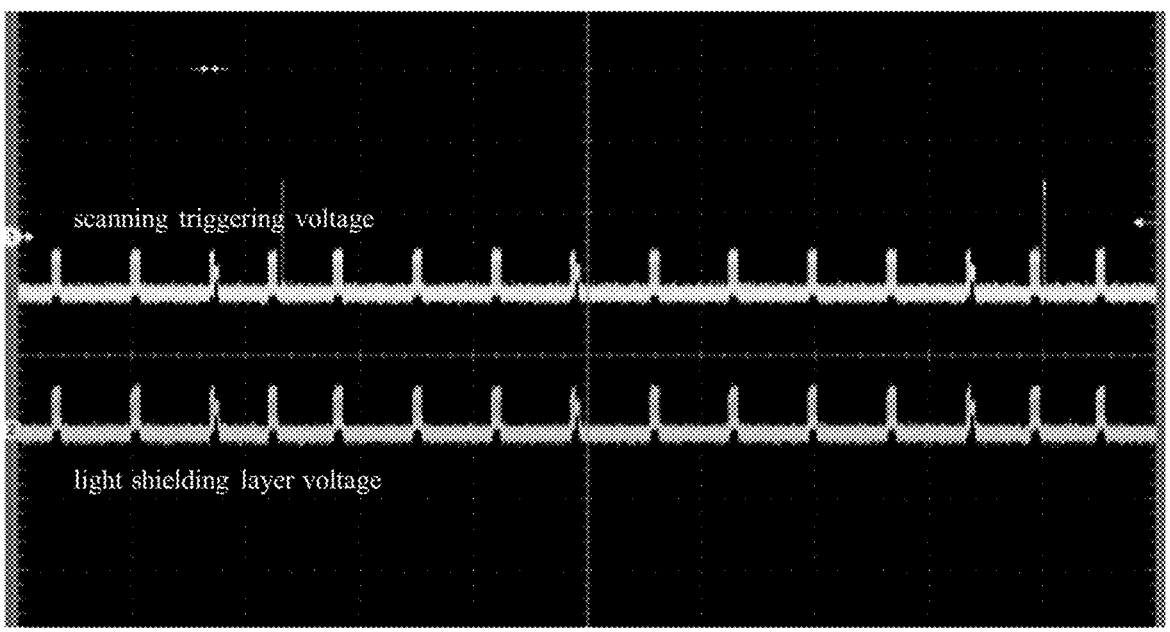
FIG. 6 schematically illustrates operation waveform diagrams of a light shielding layer and an array substrate of a touch display panel according to an exemplary embodiment during a touch operation.

FIG. 5 schematically illustrates the operation waveform diagrams of the light shielding layer and the array substrate of a touch display panel in the related art during the touch operation. FIG. 6 schematically illustrates the operation waveform diagrams of the light shielding layer and the array substrate of a touch display panel according to an exemplary embodiment during the touch operation.

FIG. 5 specifically shows the waveforms of the voltages of the light shielding layer (the lower waveform—the voltage of the light shielding layer) and the array substrate (the upper waveform—the scanning triggering voltage) of the touch display panel in the related art (where the static electricity charges are discharged in real time). As shown in FIG. 5, the waveform of the voltage of the array substrate is different from that of the light shielding layer, so the capacitance between the array substrate and the light shielding layer will influence the touch performance. FIG. 6 specifically shows the waveforms of the voltages of the light shielding layer and the array substrate of the touch display panel according to an exemplary embodiment. It can be seen from FIG. 6 that the waveform of the voltage of the light shielding layer is the same as the waveform of the voltage of the array substrate. There is no voltage difference between the scanning triggering voltage and the light shielding lager voltage, so the interference capacitance will not be generated, such that the touch performance of the array substrate is stable and therefore ensures the stability of the touch performance of the touch display panel and the unity of the performances across the panel.

A plurality of touch units and pixel units are integrated on the array substrate of the touch display device according to an exemplary embodiment, in order to implement the touch and display functions. The array substrate 2 alternatively performs the touch operation and the display operation at a preset frequency. The specific time periods for touch operation and display operation can be set according to the actual needs. During the operation of the touch unit, the switching element 8 is controlled to be an open circuit, so that the static electricity is not discharged from the panel. During the operation of the pixel unit, the switching element 8 is controlled to be closed so that the static electricity is discharged through the ground wire 7. Therefore, the switching element 8 can directly use the operation signal of the pixel unit or a signal obtained by processing the operation signal of the pixel unit as a control signal which reflects the operating state of the touch display panel, thereby enabling the switching element 8 to be turned off during the operation of the touch unit, and to be turned on during the operation of the pixel unit. In addition, the switching element 8 may also use a signal obtained by inverting the operation signal of the touch unit as the control signal.

The present disclosure does not limit the specific type of the switching element 8. It may be, for example, a switching element such as a MOSFET or a TFT. The switching element 8 in exemplary embodiments may be implemented by, for example, at least one TFT formed on the array substrate 2.

According to another exemplary embodiment, there is provided a display device comprising the touch display panel according to any one of the exemplary embodiments. The display device using the touch display panel according to the exemplary embodiments may have a better display and touch performance, thereby improving the user experience.

Figure 7:
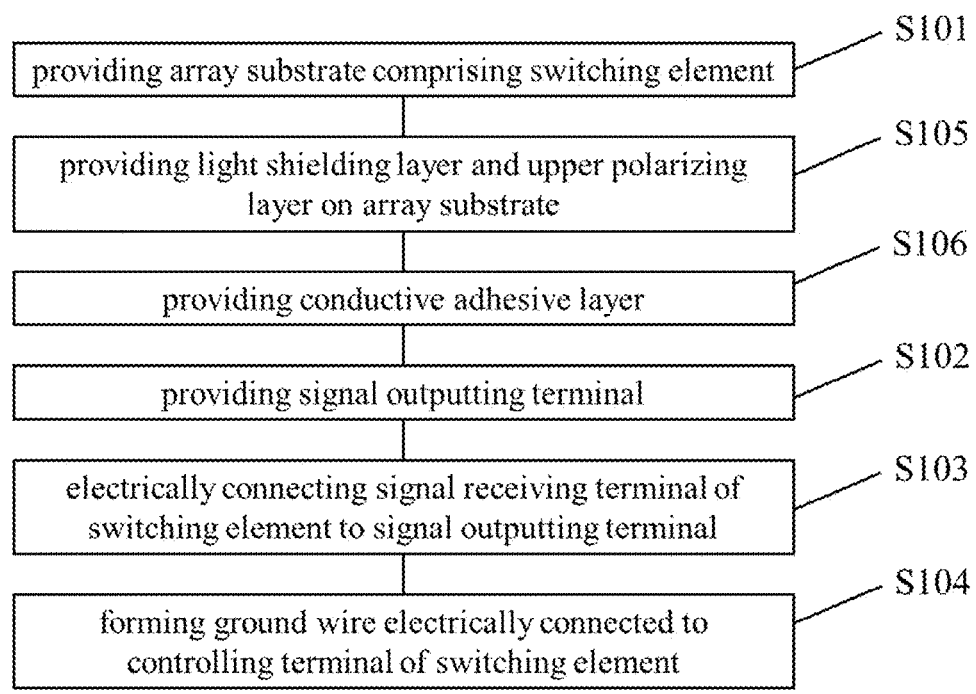
FIG. 7 schematically illustrates a flowchart of a method for manufacturing a touch display panel according to an exemplary embodiment.

According to yet another exemplary embodiment, there is provided a method for manufacturing a touch display panel. FIG. 7 shows a flowchart of a method for manufacturing a touch display panel according to an exemplary embodiment.

As shown in FIG. 7, in some exemplary embodiments, the method for manufacturing a touch display panel comprises the following steps:

provide an array substrate comprising a switching element, wherein the switching element comprises a signal receiving terminal and a controlling terminal (Step S101), providing a signal outputting terminal configured to output a signal indicating an operating state of the touch display panel (Step S102), electrically connecting the signal receiving terminal of the switching element to the signal outputting terminal (Step S103), and forming a ground wire electrically connected to the controlling terminal of the switching element (Step S104).

Figure 8:
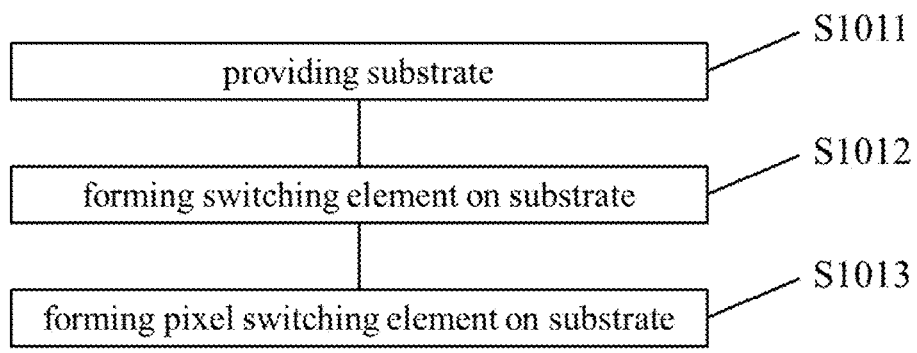
FIG. 8 schematically illustrates a flowchart of a method for manufacturing a touch display panel according to another exemplary embodiment.

In some exemplary embodiments, the switching element 8 is formed at the same time as the pixel switching element in the array substrate. Therefore, as shown in FIG. 8, Step S101 may comprise the following sub-steps:

providing a substrate (Step S1011), forming the switching element on the substrate (Step S1012), and forming a pixel switching element on the substrate (Step S1013), wherein Step S1012 and Step S1013 can be performed simultaneously and adopt the same set of manufacturing processes. Specifically, the terms such as "performed simultaneously" mean that two steps are performed in the same time period, and the resulting elements obtained from the steps are formed simultaneously. In addition, the terms such as "adopting the same set of manufacturing processes" mean that each step in the set of manufacturing processes simultaneously affects the formation of the switching element and the formation of the pixel switching element. After the set of processes is finished, the switching element is obtained and the pixel switching element is also obtained. By the above method, the ground wire 7 is electrically connected between the ground terminal of the array substrate and the low potential, and the controlling terminal 82 of the switching element 8 is electrically connected to the ground wire 7. The signal receiving terminal 81 of the switching element 8 is connected to the signal outputting terminal S of the touch display panel 1. The signal outputting terminal S is configured to output a signal indicating the operating state of the touch display panel 1. Therefore, after receiving this signal, the switching element 8 can be turned on or off according to the operating state of the touch display panel 1. When the switching element 8 is turned on, the static electricity charges accumulated in the touch display panel 1 can be discharged to the ground through the ground wire 7.

The touch display panel manufactured by the method according to exemplary embodiments can control the discharging period of the static electricity generated in the touch display panel 1 during operation, thereby eliminating or reducing the influence of the interference capacitance caused by the static electricity on the touch operation, so as to improve the display and touch performance of the display panel.

In some exemplary embodiments, the method further comprises providing a light shielding layer and an upper polarizing layer on the array substrate (Step S105). In this case, in Step 104, the ground wire is electrically connected to at least one of a ground terminal of the array substrate, a ground terminal of the light shielding layer, and a ground terminal of the upper polarizing layer. In some exemplary embodiments, the method further comprises providing a conductive adhesive layer 5 (Step S106), wherein at least two of the ground terminal of the array substrate 2, the ground terminal of the light shielding layer 4, and the ground terminal of the upper polarizing layer 3 are each connected to the conductive adhesive layer 5. Meanwhile, in Step 104, the ground wire 7 is electrically connected to the conductive adhesive layer 5. Therefore, the ground wire 7 can discharge the static electricity from a plurality of ground terminals in the touch display panel 1 to a low potential.

In summary, the present disclosure provides a touch display panel, a method for manufacturing a touch display panel, and a display device. The touch display panel comprises a ground wire and a switching element. The ground wire is configured to allow the static electricity of the touch display panel to be discharged through the ground wire. The switching element is configured to be turned on or off according to the operating state of the touch display panel to control whether the static electricity is discharged through the ground wire.

The touch display panel provided by the present disclosure has a better display effect, and the touch performances are uniform across the entire panel. In addition, the connection and disconnection of the ground wire can be controlled according to the operating state of the display panel, so that the static electricity generated during the touch operation of the display panel can be discharged during the display operation, thereby improving the display and touch performance of the display panel.

Other variations to the disclosed exemplary embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope. The drawings only schematically show the arrangement order of the elements in some exemplary embodiments, and are not used to limit the distance between the elements. It should also be understood that, unless explicitly stated to the contrary, in any method that comprises more than one step or action, the order of the steps or actions of the method is not necessarily limited to the order in which the steps or actions of the method are recited.

We claim:

1. A touch display panel, comprising:
   a ground wire configured to allow static electricity in the touch display panel to be discharged through the ground wire,
   a switching element configured to be turned on or turned off according to an operating state of the touch display panel to control whether the static electricity is discharged through the ground wire,
   an array substrate, wherein the switching element is in the array substrate,
   a light shielding layer,
   an upper polarizing layer, and
   a conductive adhesive layer,
   wherein at least two of a ground terminal of the array substrate, a ground terminal of the light shielding layer and a ground terminal of the upper polarizing layer are electrically connected to the ground wire through the conductive adhesive layer.

2. The touch display panel of claim 1, wherein
   the operating state of the touch display panel comprises a touching state and a displaying state, and the switching element is configured to be turned off in response to the touching state such that the static electricity is not discharged through the ground wire and to be turned on in response to the displaying state such that the static electricity is discharged through the ground wire.

3. The touch display panel of claim 1, further comprising an array substrate, wherein the switching element is in the array substrate.

4. The touch display panel of claim 3, wherein the ground wire is electrically connected to a ground terminal of the array substrate.

5. The touch display panel of claim 1, further comprising a light shielding layer, wherein a ground terminal of the light shielding layer is electrically connected to the ground wire.

6. The touch display panel of claim 1, further comprising an upper polarizing layer, wherein a ground terminal of the upper polarizing layer is electrically connected to the ground wire.

7. A display device, comprising the touch display panel according to claim 1.

8. A method for manufacturing a touch display panel, comprising:
providing an array substrate comprising a switching element, wherein the switching element comprises a signal receiving terminal and a controlling terminal,
providing a light shielding layer and an upper polarizing layer on the array substrate,
providing a conductive adhesive layer such that at least two of a ground terminal of the array substrate, a ground terminal of the light shielding layer and a ground terminal of the upper polarizing layer are each electrically connected to the conductive adhesive layer,
providing a signal outputting terminal configured to output a signal indicating an operating state of the touch display panel,
electrically connecting the signal receiving terminal of the switching element to the signal outputting terminal, and
forming a ground wire electrically connected to the controlling terminal of the switching element and electrically connected to the conductive adhesive layer.

9. The method of claim 8, wherein forming the ground wire electrically connected to the controlling terminal of the switching element comprises:
electrically connecting the ground wire to a ground terminal of the array substrate.

10. The method of claim 8, wherein forming the ground wire electrically connected to the controlling terminal of the switching element comprises:
electrically connecting the ground wire to at least one of a ground terminal of the array substrate, a ground terminal of the light shielding layer and a ground terminal of the upper polarizing layer.

11. The method of claim 8, wherein providing the array substrate comprising the switching element comprises:
providing a substrate,
forming the switching element on the substrate, and
forming a pixel switching element on the substrate,
wherein forming the switching element on the substrate and forming the pixel switching element on the substrate are conducted simultaneously and adopt a same process.

* * * * *